(12) United States Patent
Katai

(10) Patent No.: US 6,773,497 B2
(45) Date of Patent: Aug. 10, 2004

(54) CELLULOSE ACYLATE FILM AND METHOD OF PRODUCING THEREOF

(75) Inventor: Yukihiro Katai, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/202,882

(22) Filed: Jul. 26, 2002

(65) Prior Publication Data

US 2003/0027004 A1 Feb. 6, 2003

(30) Foreign Application Priority Data

Jul. 26, 2001 (JP) ........................................ 2001-225440

(51) Int. Cl.[7] ................... G09D 101/10; G09D 101/12; C09K 19/52
(52) U.S. Cl. ............... 106/170.27; 106/170.4; 106/170.47; 106/170.49; 106/171.1; 106/168.01; 536/69; 428/1.31; 428/1.33
(58) Field of Search ................. 106/170.27, 170.4, 106/170.47, 170.49, 171.1, 168.01; 536/69; 428/1.31, 1.33

(56) References Cited

U.S. PATENT DOCUMENTS

| | | | | |
|---|---|---|---|---|
| 5,663,310 A | * | 9/1997 | Shimoda et al. | ............... 536/69 |
| 5,695,694 A | | 12/1997 | Iwata et al. | |
| 5,783,121 A | * | 7/1998 | Yamazaki et al. | ............ 264/28 |
| 5,962,677 A | * | 10/1999 | Murakami et al. | ............ 536/69 |
| 6,036,913 A | * | 3/2000 | Shibue et al. | ................ 264/489 |
| 6,211,358 B1 | * | 4/2001 | Honda et al. | ................. 536/64 |
| 2002/0050668 A1 | * | 5/2002 | Yamazaki et al. | .......... 264/556 |

FOREIGN PATENT DOCUMENTS

| | | |
|---|---|---|
| EP | 0 647 671 A1 | 4/1995 |
| EP | 0647671 * | 4/1995 |
| EP | 0 953 592 A2 | 11/1999 |
| JP | 8-29619 | 2/1996 |
| JP | 8-239509 | 9/1996 |
| JP | 11-80381 | 3/1999 |
| JP | 11-124445 | 5/1999 |
| JP | 11-248940 | 9/1999 |

* cited by examiner

Primary Examiner—David Brunsman
(74) Attorney, Agent, or Firm—Birch, Stewart, Kolasch & Birch, LLP

(57) ABSTRACT

A cellulose acylate film formed from a solution of cellulose acylate contains a solvent of the solution at 0.1–0.6 wt. %, and acids at less than 500 ppm. The solvent is composed of at least one of esters and ketones, and further a recycled solvent recycled from the solution. In order to produce the cellulose acylate film, the solution is applied on a dope band moving in a direction, and dried to contain the solvent between 10–80 wt. % to the cellulose acylate. Thus a film-like material is formed from the solution, and peeled from the dope band. Thereafter the film-like material is further dried to form the cellulose acylate film containing the solvent at between 0.1 and 0.6 wt. %.

31 Claims, 1 Drawing Sheet

CELLULOSE ACYLATE FILM AND METHOD OF PRODUCING THEREOF

BACKGROUND OF THE INVENTION

1. Field of the Invention

The present invention relates to a cellulose acylate film and a method of producing thereof.

2. Description Related to the Prior Art

A cellulose acylate film formed of cellulose acylate is used as a base of a photosensitive material, as cellulose acylate is strong and has incombustibility. In the cellulose acylate film there is for example cellulose acetate. Recently, cellulose acetate having an acetylic degree between 57.5 and 62.5% becomes preferable to be used as a protective film of a deflective plate and a color filter in a liquid crystal displaying device, while having an extremely optical isotropy.

The cellulose acylate film is usually formed in a producing method of a film from a solution. In the producing method, the cellulose acylate film may be produced so as to have better optical character and properties of matter than in melt-casting method and the like. In the producing method, the cellulose acylate is solved in a solvent to obtain the solution. The solution is applied on a dope band, and thereafter the solvent is evaporated to form the cellulose acylate film. As the solvent, hydrocarbone halides (especially methylene chloride and the like) and are used.

However, when containing the solvent so much, the solvent evaporates suddenly. Therefore, bubbles issue in the dope solution in a high temperature, which makes the quality of the cellulose acetate film lower.

Further, when the solvent is evaporated from the cellulose acetate film entirely, the cellulose acetate film loses a flexibility and becomes to be easily broken and cut. Further, when the solvent remains in the cellulose acetate film so much, a thermal shrinkage of the cellulose acetate film issues easily to make a quality thereof lower. When the cellulose acetate film with the thermal shrinkage is used as the protective film of the deflective plate, the deflective plate is deformed. Accordingly, phases close to edges on the deflective plate becomes disordered, and images thereon are deformed.

The thermal shrinkage of the cellulose acetate film is not entirely prevented, as the temperature changes in producing the cellulose acetate film. So as to compensate for the deformation of the cellulose acetate film, a pressure sensitive may be used. However, as the pressure sensitive is heavily hardened, it flows out on a surface through which the deflective plate is cut. Accordingly, when the cellulose acetate film is used as the protective film, it should be transparent and low complex reflactive, and stability to the change of the temperature.

Recently, it becomes problematic because of circumstance protection to use the hydrocarbon halides (for example, methylene chloride), and it is requested to reduce the amount of hydrocarbon halides to be used. Accordingly, methylacetate, ketones and the like are used as the solvent, and the cellulose acylate is solved in them in an especially low temperature or a high temperature, or a large pressure is applied during solving the cellulose acylate.

Also when the ketones are used as the solvent, the ketones should not remain in the cellulose acetate film so much. When cellulose acetate film containing so much ketones, the ketones change the color of the deflective elements in the deflective plate such that the deflective plate becomes unusable.

Further, when components generated by dissolving of the cellulose acylate remains in the cellulose acetate film, the cellulose acylate film accelerates the transesterification and the dissolution of the cellulose acylate film. Thus, carboxylic acid is produced (especially acetylic acid is produced when methyl acetate is used as cellulose acylate). Accordingly, when the cellulose acylate film is used in the deflective plate, the deflective plate may be easily deformed in large temperature and humidity.

Note that it is proposed to use a cycloester as the solvent. In this case, however, the cycloester is hardly used as it has large inflammability and dissolutes easily.

SUMMARY OF THE INVENTION

An object of the present invention is to provide a cellulose acylate film in which thermal shrinkage does not issue so much.

Another object of the present invention is to provide a cellulose acylate film in which a solvent remains at a predetermined weight percentage.

Still another object of the present invention is to provide a cellulose acylate film produced without harmful influences on a circumstance.

In order to achieve the object and the other object, the cellulose acylate film contains the solvent at 0.1–0.6 wt. %. The solvent is composed of at least one of esters and ketones. Further, the cellulose acylate film contains acids at 500 ppm that are products of dissolution of the esters. Furthermore, the solvent may contain a recycled solvent at 80% before producing the cellulose acylate film. The recycled solvent is recycled during production of the cellulose acylate film.

In order to produce the cellulose acylate films, a support (or dope band) is moved, on which the solution is applied. In the solution, an amount ratio of the solvent is 10–200 wt. % to cellulose acylate. The solution is dried on the support to form a film-like material. The film-like material contains the solvent at less than 200 wt. %, preferably less than 10 wt. %, to the cellulose acylate, and is peeled from the support. Then the film-like material is dried to form the cellulose acylate film containing the solvent at between 0.1–0.6%.

According to the cellulose acylate film of the present invention, the thermal shrinkage does not occur so much. Further, the producing of the cellulose acylate film does not harmfully influence on the circumstance so much.

BRIEF DESCRIPTION OF THE DRAWINGS

The above objects and advantages of the present invention will become easily understood by one of ordinary skill in the art when the following detailed description would be read in connection with the accompanying drawing.

PREFERRED EMBODIMENTS OF THE INVENTION

[Cellulose Acylate]

Figure 1:
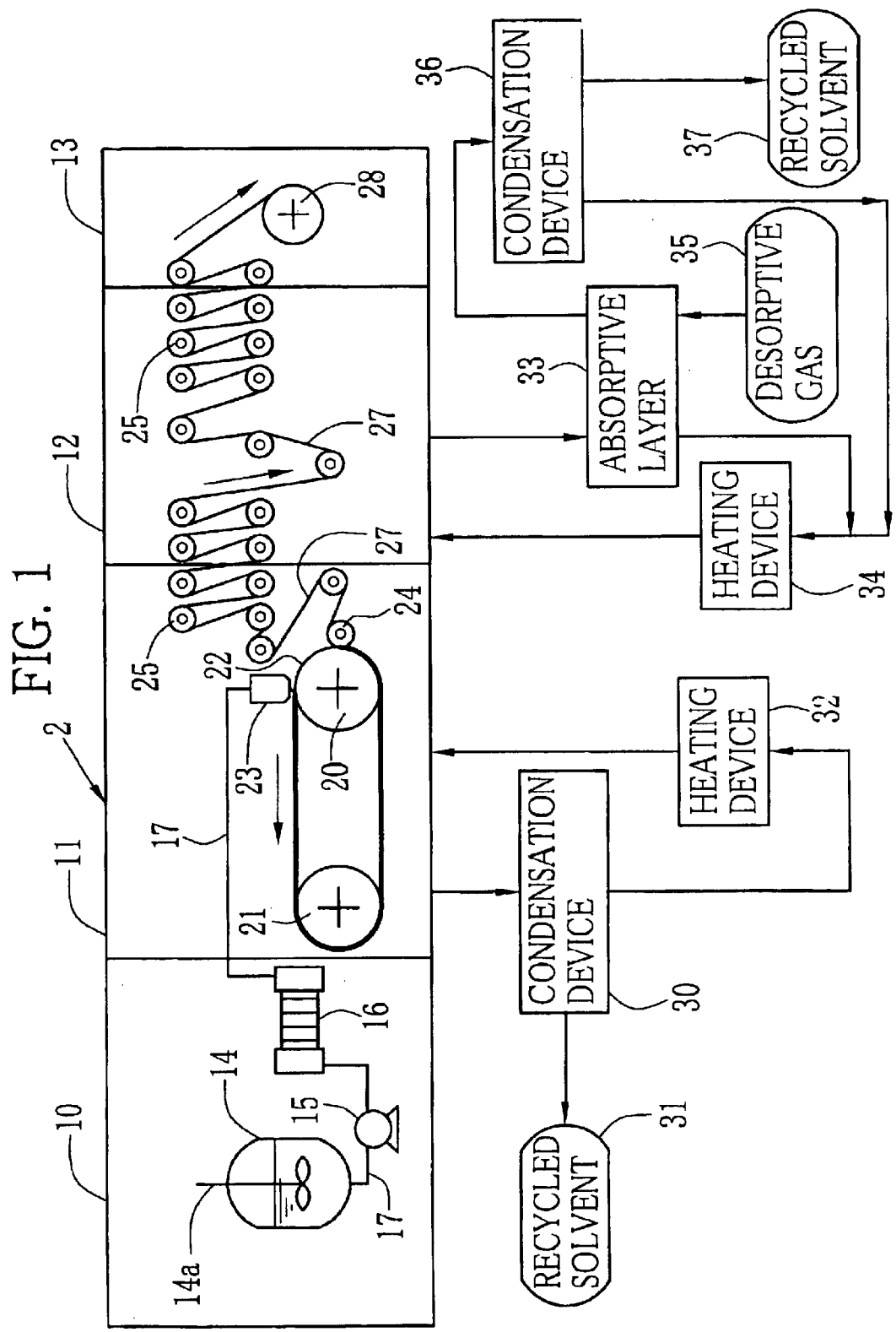
FIG. 1 is a schematic diagram of a device for producing a cellulose acylate film of the present invention.

In the present invention, a solution of cellulose acylate is used for forming a cellulose acylate film. In the cellulose acylate, cellulose acetate having acetylic degree between 57.5% and 62.5% is preferably used. The acetylic degree means the amount of the acetylic acid bound to a unit of weight of cellulose. The acetylic degree is calculated based on a result of measurement of acetylification with ASTM:D-817-91. More than 90% of particles of the cellulose acylate have diameter between 0.1 mm and 4 mm, preferably between 1 mm and 4 mm. Further, the amount of particles having the diameter between 0.1 mm and 4 mm is preferably more than 95%, particularly more than 97%, especially more than 98%, and most especially more than 99%. Furthermore, the amount of the particles have diameter between 2 mm and 3 mm is preferable more than 50%, particularly more than 70%, especially more than 80%, and more especially more than 90%. It is preferable that the particles have nearly spherical shape.

[Solvent]

As solvents of the solution, there are esters, ketones, ethers and the like. Only one of these solvents may be used or several sorts of them, when having 1–6 carbons, may be mixed. In the esters, there are methyl acetate, methylformate, ethylacetate, amylacetate, butylacetate, and the like. In the ketons there are acetone, methylethyl ketone, cyclohexanone, and the like. In ethers, there are dioxane, dioxorane, tetrahydrofuran, diethylether, methyl-t-butylether, and the like).

[Additives]

There are some additives added in the solution. As additives used in the present invention, there are plasticizers, ultraviolet absorptive agent (hereafter UV-agent). In the plasticizers, there are, for example, phosphoric acid esters (triphenylphosphate, tricrezylphosphate, cresyldiphenylphosphate, octyldiphenylphosphate, diphenylbiphenylphosphate, trioctylphosphate, tributylphosphate and the like), phthalic acid esters (diethylphthalate, dimethoxyethylphthalate, dimethylphthalate, dioctylphthalate, and the like), glycolic acid esters (triacetine, tributyline, butylphthalylbutylgrycorate, ethylphthalylethylgrycorate, methylphthalylethylgrycolate, butylphthalylbutylgrycolate, and the like). Only one of them can be used singly, or several ones of them may be mixed. Further, other plasticizers can be also used that are disclosed in Japanese Patent-Laid Open Publications No. H11-80381, H11-124445 and H11-248940. Preferably, hydrophobic plasticizers are contained at between 1% and 20% to the cellulose acylate.

In the present invention, more than one of the UV-agents is preferable to be contained in the solution. It is preferable that the UV-agents especially absorbs ultraviolet rays having less than 370 nm wave length, and hardly absorbs visible rays having more than 400 nm wave length. For example, oxybenzophenone type compounds, benzotriasol type compounds, salisylic acid type compounds, benzophenone type compounds, cyanoacrylate type compounds, nickel complex salt type compounds. Particularly preferable are benzotriasol type compounds and benzophenone type compounds. Especially preferable is benzophenone type compounds, as they do not carry out coloring the cellulose ester. Furtherthere are benzocreasol type compounds disclosed in Japanese Patent-Laid Open Publication No. H08-29619 and UV-agents disclosed in Japanese Patent Laid-Open Publication No. H08-239509. Furthermore, other UV-agents already known can be used.

As the preferable UV-agents, there are 2,6-di-tert-butyl-p-cresol; pentaerythrithyl-tetrakis [3-(3,5-di-tert-butyl-4-hydroxyphenyl)propionate]; triethyleneglycol-bis[3-(3-tert-butyl-5-methyl-4-hydrozyphenyl)propionate]; 1,6-hexadiol-bis[3-(3,5-di-tert-butyl-4-hydroxyphenyl) propionate]; 2,4-bis-(n-octylthio)-6-(4-hydroxy-3,5-di-tert-butylanylino)-1,3,5-triasine, 2,2-thio-diethylenebis[3-(3,5-di-tert-butyl-4-hydroxyphenyl)propionate, octadecyl-3-(3,5-di-tert-butyl-4-hydroxyphenyl) propionate; N,N'-hexamethylenebis(3,5-di-tert-butyl-4-hydroxy-hydrocineamide); 1,3,5-trimethyl-2,4,6-tris(3,5-di-tert-butyl-4-hydroxybenzyl)benzene, tris-(3,5-di-tert-butyl-4-hydroxybenzyl)isocyanulate; and the like. Most preferable are 2,6-di-tert-butyl-p-crezol; pentaerythrithyl-tetrakis[3-(3,5-di-tert-butyl-4-hydroxyphenyl)-propionate; triethylengrycol-bis[3-(3-tert-butyl-5-methyl-4-hydroxyphenyl)propionate]. Further, the following materials may be additionally contained, for example, metal deactivator of hydrazine type compounds (N,N'-bis[3-(3,5-di-tert-butyl-4-hydroxyphenyl)propionyl] hydrazine and the like); phosphor type working stabilizer (tris(2,4-di-tert-butylphenyl)phosphite and the like). The amount of the above additives may be 0.1–5 wt. % to the cellulose acylate.

If necessary, other additives, for example peeling accelerator, fluorine type surface-active agent and mold lubricant may be added in the solution.

[Process of Producing a Cellulose Acylate Film]

In FIG. 1, a device 2 for producing a cellulose acylate film is constructed of a solution preparing section 10, a casting section 11, a drying section 12 and a winding section 13. The solution preparing section 10 includes a mixer 14, a solution feeding device 15, a filter 16. The mixer 14 is connected with a die 23 of the casting section 11 through a pipe 17, and contains the solution of cellulose acylate. To the mixer 14 a mixing bar 14a is rotatably attached for mixing the solution in the mixer 14. Between the mixer 14 and the die 23, the solution feeding device 15 and the filter 16 are disposed. The casting section 11 includes band rollers 20, 21, a dope band 22, a die 23, and a roller 25, and is further provided with a condensation device 30 and a heating device 32.

In the solution preparing section 10, when the mixing bar 16a rotates, cellulose acylate, the solvents the additives and other materials are mixed in the mixer 14 to make the solution. Thereby the particles of cellulose acylate are swollen in the solvent. Note that in the present invention can be additionally used a recycled solvent recycled from the solution in the die 23. In this case, the recycled solvent is preferably contained more than 80% in the solvent for decreasing a cost for producing the cellulose acylate film. After mixed, the solution is fed through the pipe 17 in the die 23 by the solution feeding device 15.

When the solution applied on the dope band 22, the band rollers 20, 21 are driven to rotate, and the dope band 22 is cyclically moves in an arrowed direction. Then the solution fed from the mixer 14 is applied on the dope band 22 and dries on the dope band 22 to form a cellulose acylate film (hereinafter film) 27. While the solution on the dope band 22 is dried, a part of the solvent in the solution evaporated as a first evaporation gas, and sucked in the condensation device 30. In the condensation device 30, the first evaporation gas of the solvent is condensed in liquid and obtained as a recycled solvent 31. The first evaporation gas further contains other gas components which are not condensed with the condensation device. The other gas components are heated in the heating device 32 again and fed in the casting section 11 for drying the solution. Thus the film 27 is formed so as to contain the solvent less than 200 wt. %, preferably between 10 and 80 wt. %, to the cellulose acylate, and then, peeled from the dope band 22 by a peeling roller and fed with the rollers 25 in the drying section 12.

In order to effectively evaporate the solvent, a temperature in the casting section 11 is preferably kept higher. In the solution, when the solvent is contained at between 10 and 200% to the cellulose acylate, the temperature of the film 27 is kept between 0 and 130° C. for 1–20 minutes. If the temperature is lower than 0° C., so much time is necessary for drying the solution. Therefore the cost becomes higher. If the temperature is higher than 130° C., the solvent is evaporated in a short time, which cases a deformation in the film 27. The temperature of the film 27 can be measured with a thermocouple very fast, or with a known thermometer which detects infrared ray.

In the drying section 12, the film 27 is further dried. The temperature of the film 27 is between 100 and 145° C. for 1–120 minutes. Thus, the solvent remaining in the film 27 is evaporated, and the film 27 is dried so as to contain the solvent at between 0.1 and 0.6 wt. %, preferably at between 0.2 and 0.4%.

If the film 27 containing the solvent at more than 0.6% is used in a deflection plate, a thermal shrinkage occurs to deform the deflection plate. If the film contains the solvent at less than 0.1%, the film 27 does not have flexibility, and therefore is easily broken.

Note that when the ketones are used as the solvent, the film 27 preferably contains less than 0.3%. Further, when the cycloketones, such as cyclohexanone, are used as the solvent, the film 27 contains less than 0.2%.

Further, the acids are produced by dissolving the esters used as the solvent, and are preferably contained at less than 500 ppm in the film 27. For example, when ethylacetate is used as the solvent, acetylic acid is produced. In this case, the amount of the acid means the amount of the acetylic acid in the film 27.

While dried in the drying section 12, the solvent is evaporated in an air as a second evaporation gas. A density of the second evaporation gas is lower than that of the first evaporation gas. The amount of the second evaporation gas is much smaller than that of the first evaporation gas. The second evaporation gas is absorbed in the absorptive layer 33. The absorptive layer 33 contains absorptive materials, for example, activated carbon, zeolite and silica gel. After absorbed in the absorptive layer 33, the second evaporation gas is desorpted by a desorptive gas 35, and fed to a condensation device 36. In the condensation device 36, the second evaporation gas is condensed to liquid of a recycled solvent 37. Further, there are some gas components which are not absorbed in the absorptive layer 33. The some gas components are sent and heated in a heating device 34, and thereafter fed as a drying blow in the drying section 12 again.

The recycled solvents 31 and 37 are reused for preparing the solution. For example, when acetylic acid ester is used as solvent of the solution, acetylic acid is produced in the absorptive layer 33. However, acetylic acid may be contained at less than 100 ppm in the solvent used for the solution.

After drying the solution, the film 27 is wound by a film winder 28 provided in the winding section 13, and utilized in a liquid-crystal displaying device and the like.

In the above embodiment, when a plurality of the solutions may be applied on the dope band with the die 23, the film 27 is constructed of a plurality of layers.

[Experiment]

In Experiment, Examples 1–7 and Comparison 1–6 of the cellulose acylate film are produced, and several estimations are carried out.

EXAMPLE 1

A solvent ST1 is prepared for forming Example 1 by mixing 80 parts by weight of methyl acetate, 15 parts by weight of ethanol and 5 parts by weight, of butanol. In the solvent ST1 are added 18.5 parts by weight of cellulose triacetate (acetylic degree is 59.5%) and 1.5 parts by weight of triphenylphosphate (hereinafter TPP) to obtain a mixture M1. The mixture M1 is cooled down to −70° C., and fed in an autoclave whose inside is filled with nitrogen gas. In the autoclave, the mixture M1 is heated at 160° C., in 2.0 MPa for 10 minutes and filtrated to obtain a solution SN1. Thereafter the solution SN1 is applied on the dope band at 50° C. to have thickness of 80 $\mu$m thereon, and dried to form a cellulose triacetate film. Then the cellulose triacetate film formed of the solution SN1 is peeled from the dope band and further dried at 120° C. for 10 minutes and thereafter 145° C. for 15 minutes. Thus, Example 1 is obtained with the solvent ST1 at 0.4 wt. %.

EXAMPLE 2

Example 2 is produced in the same method as Example 1, except drying at 145° C. for 15 minutes after drying at 120° C. for 10 minutes. The Example 2 is obtained with the solvent ST1 at 0.6 wt. %.

EXAMPLE 3

A solvent ST2 is prepared for forming Example 3 by mixing 70 parts by weight of methyl acetate, 15 parts by weight of acetone and 15 parts by weight of ethanol. In the solvent ST2 are added 25 parts by weight of cellulose triacetate (acetylic degree is 60%) and 1.5 parts by weight of TPP to obtain a mixture M2. The mixture M2 is fed in an autoclave whose inside of the autoclave is filled with nitrogen gas. In the autoclave, the mixture M2 is heated at 180° C., in 2.0 MPa for 10 minutes and filtrated to obtain a solution SN2. Thereafter the solution SN2 is applied on the dope band at 50° C. to have thickness of 80 $\mu$m, and dried to form a cellulose triacetate film on the dope band. Then the celluloce triacetate film formed of the solution SN2 is peeled from the dope band and further dried at 120° C. for 5 minutes and thereafter 145° C. for 15 minutes. Thus, Example 3 is obtained with acetone at 0.2 wt. %.

EXAMPLE 4

A solvent ST3 is prepared for forming Example 4 by mixing 70 parts by weight of methyl acetate, 15 parts by weight of cyclopentanone, 15 parts by weight of ethanol. In the solvent ST3 are added 25 parts by weight of cellulose triacetate (acetylic degree is 61%) and 1.5 parts by weight of TPP to obtain a mixture M3. The mixture M3 is fed in an autoclave whose inside is filled with nitrogen gas. In the autoclave, the mixture M3 is heated at 180° C., in 1.5 MPa for 10 minutes and filtrated to obtain a solution SN3. Thereafter the solution SN3 is applied on the dope band at 50° C. to have thickness of 80 $\mu$m, and dried to form a cellulose triacetate film. Then the cellulose triacetate film formed of the solution SN3 is peeled from the dope band and further dried at 120° C. for 10 minutes and thereafter 145° C. for 120 minutes. Thus, Example 4 is obtained with cyclopentanone at 0.2 wt. %.

EXAMPLE 5

The mixture M2 is fed in an autoclave whose inside is filled with nitrogen gas. The mixture M2 is heated at 180° C., in 2.0 MPa for 15 hours and filtrated to obtain a solution SN4. The solution SN4 is applied on the dope band at 50° C. and dried to form a cellulose triacetate film is formed. Then the cellulose triacetate film is peeled from the dope band, and further dried at 120° C. for 5 minutes and thereafter 145° C. for 15 minutes. Thus, Example 5 is obtained with acetone at 0.2 wt. % as the solvents.

EXAMPLE 6

Example 6 is produced in the same method as Example 3, except methyl acetate containing acetylic acid at 143 ppm. In this case, the solution applied on the dope band contains acetylic acid at 100 ppm.

EXAMPLE 7

A solvent ST4 is prepared for forming Example 7 by mixing 65 parts by weight of acetone, 20 parts by weight of cyclopentanone, 10 parts by weight of ethanol and 5 parts by weight of butanol. In the solvent ST2 are added 20 parts by weight of cellulose triacetate (acetylic degree is 59.5%), 1.2 parts by weight of ditrimethylolpropanetetraacetate (plasticizer), 1.2 parts by weight of TPP (plasticizer), 0.2 parts by weight of 2,4-bis-(n-octylthio)-6-(4-hydroxi-3,5-di-tert-butylanylino)1,3,5-triasine (UV-agent), 0.2 parts by weight of 2(2'-hydroxy-3',5'-di-tert-butylphenyl)-5-chlorobenzotriasol (UV-agent), 0.2 parts by weight of (2(2'-hydroxi-3',5'-di-tert-amylphenyl)-5-chlorbenzotriasol (UV-agent), 0.02 parts by weight of $C_{12}H_{25}OCH_2CH_2O$—P(=O)—$(OK)_2$ (mold lubricant), 0.02 parts by weight of citric acid (mold lubricant) and 0.05 parts by weight of particles (silica gel whose diameter is 20 nm, Mohs' scale of hardness is about 7). The mixture is cooled down at −80° C., thereafter heated at 50° C. and filtrated to obtain a solution SN4. The solution SN4 is applied on the dope band at 50° C. to have width of 80 μm and dried on the dope band to form a cellulose triacetate film. Then the cellulose triacetate film formed of the solution SN4 is peeled from the dope band and further dried at 125° C. for 15 minutes and thereafter 145° C. for 120 minutes. Thus, Example 7 is obtained with the solvent ST4 at 0.4 wt. % (containing acetone at 0.1 wt. %, cyclopentanone at 0.2 wt. %, and other components of the solvent ST4 at 0.1 wt. %).

(Comparison 1)

Comparison 1 is produced in the same method as Example 1, except drying at 130° C. for 15 minutes after drying at 120° C. for 10 minutes. Comparison 1 is obtained with the solvent ST1 at 0.8 wt. %.

(Comparison 2)

Comparison 2 is produced in the same method as Example 3, except drying at 145° C. for 10 minutes after drying at 120° C. for 5 minutes. Comparison 2 is obtained with the solvent ST2 at 0.3 wt. %.

(Comparison 3)

Comparison 3 is produced in the same method as Example 4, except drying at 145° C. for 60 minutes after drying at 120° C. for 10 minutes. Comparison 3 is obtained with the solvent ST3 at 0.3 wt. %.

(Comparison 4)

In the solvent ST2 are added 25 parts by weight of cellulose triacetate (acetylic degree is 61%) and 1.5 parts by weight of TPP to obtain a mixture M5. The mixture M5 is fed in an autoclave whose inside of the autoclave is filled with nitrogen gas. In the autoclave, the mixture M2 is heated at 180° C. in 2.0 MPa for 18 hours and filtrated to obtain a solution SN5. Thereafter the solution SN5 is applied on the dope band at 50° C. to have thickness of 80 μm thereon and dried on the dope band to form a cellulose triacetate film. Then the celluloce triacetate film formed of the solution SN5 is peeled from the dope band and further dried at 120° C. for 5 minutes and thereafter 145° C. for 120 minutes. Thus, Comparison 4 is obtained with the solvent ST5 at 0.2 wt. %.

(Comparison 5)

Comparison 5 is produced in the same method as Comparison 3, except methyl acetate containing acetylic acid at 214 ppm. In this case, the solution applied on the dope band contains acetylic acid at 150 ppm.

(Comparison 6)

Comparison 6 is produced in the same method as Example 1, except of drying the cellulose triacetate film at 150° C. for 3 hours after drying 140° C. for 25 minutes. While the cellulose triacetate film is dried at 140° C., bubbles are generated. While the cellulose triacetate film is dried at 180° C., it slacked so much.

(Forming Deflective Plate)

The cellulose triacetate films of Examples 1–7 and Comparisons 1–6 are used for sample deflective plates. For producing the deflective plate, polyvinylalcohol is extended on deflective elements for absorbing iodine. After absorbing iodine, both sides of the deflective elements are covered with a pair of one sort of Examples 1–7 and Comparisons 1–6. Thereby an adhesive agent of polyvinylalcohol is applied between the deflective elements and the one sort of Examples 1–7 and Comparison 1–6. Thus the sample deflective plate is obtained.

[Measuring Thermal Shrinkage]

Along both edges of the sample deflective plate, holes of 6 mmφ are formed at interval so as to be about 100 mm. After a length L1 of the interval is measured, the sample deflective plates are heated at 90° C. in 5% RH for 120 hours so as to make the thermal shrinkage. Then a length L2 of the interval after heating the sample deflective plates is measured. A ratio of thermal shrinkage of each sample deflective plates is calculated according to the following formula:

$$\text{Ratio of thermal shrinkage} = \{(L1-L2)/L1\} \times 100 \ (\%)$$

[Estimation According to Ratio of Thermal Shrinkage]

Examples 1, 2, 7 and Comparison 1 are observed to carry out an estimation according to the thermal shrinkage. In Table 1, when the ratio of the thermal shrinkage is less than 0.5%, the estimation is "A". When the ratio is between 0.5–0.7%, the estimation is "B". When the ratio is more than 0.7%, the estimation is "U".

TABLE 1

|  | Amount of solvent | Estimation |
| --- | --- | --- |
| Example 1 | 0.4 wt. % | A (0.4%) |
| Example 2 | 0.6 wt. % | B (0.6%) |
| Example 7 | 0.4 wt. % | A (0.3%) |
| Comparison 1 | 0.8 wt. % | U (0.8%) |

As shown in Table 1, so larger the amount of the solvent in the cellulose triacetate film becomes, the ratio of the thermal shrinkage is larger, and therefore the quality of the cellulose triacetate film becomes worse. When the amount of the solvent is less than 0.6% preferably less than 0.4%, the cellulose acetate film is used.

[Estimation According to Color of Deflective Elements]

Examples 3, 7 and Comparisons 2 are observed with eyes to carry out an estimation according to changing color of the deflective elements that the excess ketones cause. In Table 2, acetone is used as the solvent. When the color of the deflective elements is not changed, the estimation is "A". When the color of the deflectiye elements is changed, the estimation is "U".

TABLE 2

|  | Amount of acetone | Estimation |
| --- | --- | --- |
| Example 3 | 0.2 wt. % | A |
| Example 7 | 0.1 wt. % | A |
| Comparison 2 | 0.3 wt. % | U |

As shown in Table 2, when the amount of acetone is less than 0.2%, the cellulose acetate film is used.

Further, in Table 3, cyclopentanone is used as the solvent.

TABLE 3

|  | Amount of cyclopentanone | Estimation |
| --- | --- | --- |
| Example 4 | 0.2 wt. % | A |
| Example 7 | 0.2 wt. % | A |
| Comparison 3 | 0.3 wt. % | U |

As shown in Table 3, when cyclopentanone is contained at less than 0.2 wt. %, the cellulose acetate film is used.

[Estimation According to Color and Deformation of Deflective Plates]

Examples 3–6 and Comparison 4–5 are set at 60° C. in 90% RH for 500 hours, and thereafter estimated with eyes according to changing color and deforming of the deflective elements that the excess carboxylic acid causes. In Table 4, when neither the change of the color or the deformation of the deflective elements is acknowledged, the estimation is "A". When the change of color or the form of the deflective elements is changed, the estimation is "U".

Further, Examples 3–6 and Comparisons 4–5 are separately solved in methylene chloride, to which a methanol is added such that sedimentations appear. Then a supernatant liquid is separated. The amount of acid therein is measured with JIS K1600 3.6 and the ratio of acid in each cellulose triacetate film is calculated. Furthermore, the amount of acetylic acid in the supernatant liquid is measured with gas chromatography, and the ration of acetylic acid in each cellulose triacetate film is calculated.

TABLE 4

|  | Ratio of acid | Ratio of acetylic acid | Estimation |
| --- | --- | --- | --- |
| Example 3 | 100 ppm | 100 ppm | A |
| Example 4 | 100 ppm | 100 ppm | A |
| Example 5 | 500 ppm | 500 ppm | A |
| Example 6 | 400 ppm | 400 ppm | A |
| Comparison 4 | 600 ppm | 600 ppm | U |
| Comparison 5 | 700 ppm | 700 ppm | U |

As shown in Table 4, when the ratio of acid and the ratio of acetylic acid is less than 500 ppm, the cellulose triacetate film can be used.

Various changes and modifications are possible in the present invention and may be understood to be within the present invention.

What is claimed is:

1. A cellulose acylate film produced by drying a solution in which cellulose acylate is dissolved in a solvent of at least one of esters and ketones, containing said solvent at 0.1–0.6 wt. % wherein said cellulose acylate is cellulose acetate and wherein an acetylic degree of said cellulose acetate is 57.5–62.5%.

2. A cellulose acylate film as claimed in claim 1, wherein an amount ratio of said solvent is between 0.1–0.4 wt. %.

3. A cellulose acylate film as claimed in claim 2, wherein said solvent contains ketones and esters, and said amount ratio of said solvent is between 0.1–0.3 wt. %.

4. A cellulose acylate film as claimed in claim 1, wherein said ketones and said esters have 1–6 carbons respectively.

5. A cellulose acylate film as claimed in claim 4, wherein said ketone is acetone and said ester is methyl acetate and wherein said solvent may optionally contain dioxolane.

6. A cellulose acylate film as claimed in claim 4, wherein said solvent further contains alcohols and ethers that have 1–6 carbons respectively.

7. A cellulose acylate film as claimed in claim 1, wherein said solution contains hydrophobic plasticizers at 1–20 wt. %.

8. A cellulose acylate film as claimed in claim 1, wherein said solution contains ultra-violet absorptive materials at 0.1–0.5 wt. %.

9. A deflective plate made from the cellulose acylate film as claimed in claim 1.

10. A liquid crystal displaying device made from the cellulose acylate film as claimed in claim 1.

11. A cellulose acylate film produced by drying a solution in which cellulose acylate is dissolved in a solvent of at least one of esters and ketones, containing acids at a level that is less than 500 ppm wherein said acids are a product of dissolution of said esters.

12. A cellulose acylate film as claimed in claim 11, wherein said acid is carboxylic acid.

13. A cellulose acylate film as claimed in claim 12, wherein said carboxylic acid is acetic acid.

14. A cellulose acylate film produced by drying a solution in which cellulose acylate is dissolved in a solvent of at least one of esters and ketones, containing said solvent in which recycled solvent at more than 80% is contained before producing said cellulose acylate film and said recycled solvent is recycled during production of said cellulose acylate film.

15. A cellulose acylate film as claimed in claim 14, wherein acetic acid is contained at less than 100 ppm.

16. A cellulose acylate film as claimed in claim 14, wherein said cellulose acylate is cellulose acetate.

17. A cellulose acylate film as claimed in claim 16, wherein acetylic degree of said cellulose acetate is between 57.5 and 62.5%.

18. A cellulose acylate film as claimed in claim 17, wherein said solvent further contains alcohols, ketones, esters and ethers that have 1–6 carbons respectively.

19. A cellulose acylate film as claimed in claim 14, wherein said ketone is acetone and said ester is methyl acetate and wherein said solvent may optionally contain dioxolane.

20. A cellulose acylate film as claimed in claim 14, wherein said solution contains hydrophobic plasticizer at 1–20 wt. %.

21. A cellulose acylate film as claimed in claim 14, wherein said solution contains ultra-violet absorptive materials at 0.1–5 wt. %.

22. A deflective plate made from the cellulose acylate film as claimed in claim 14.

23. A liquid crystal displaying device made from the cellulose acylate film as claimed in claim 14.

24. A method of producing a cellulose acylate film, comprising steps of:

moving a support;

casting on said support at least one sort of solution in which cellulose acylate is dissolved in a solvent of at least one of esters and ketones;

forming a film-like material by drying said at least one sort of solution;

peeling said film-like material from said support; and drying said film-like material to form said cellulose acylate film containing said solvent at between 0.1 and 0.6 wt. % wherein said cellulose acylate is cellulose acetate and wherein an acetylic degree of said cellulose acetate is 57.5–62.5%.

25. A method as claimed in claim 24, wherein an amount ratio of said solvent contained in said at least one sort of solution or said film-like material is 10–200 wt. % to said cellulose acylate.

26. A method as claimed in claim 25, wherein said solution is dried for 1–20 minutes, and a temperature of said solution is between 0–130° C. thereby.

27. A method as claimed in claim 25, wherein an amount ratio of said solvent in said film-like material being said cellulose acylate at between 10 and 80 wt. %.

28. A method as claimed in claim 27, wherein said film-like material is dried for 1–120 minutes, and a temperature of said solution is between 100–145° C. thereby.

29. A method as claimed in claim 24, wherein said at least one sort of solution is more than two sorts, and said cellulose acylate film is constructed of a plurality of layers.

30. A cellulose acylate film produced by drying a solution in which cellulose acylate is dissolved in a solvent of at least one of esters and ketones, containing said solvent at 0.1–0.6 wt. % wherein said cellulose acylate is cellulose acetate and wherein an acetylic degree of said cellulose acetate is 57.5–62.5%, and containing acids at a level that is less than 500 ppm wherein said acids are a product of dissolution of said solvent.

31. A cellulose acylate film as claimed in claim 30, wherein an amount ratio of said solvent is between 0.1–0.4 wt. %.

* * * * *